United States Patent
Larsen et al.

(10) Patent No.: US 9,313,797 B2
(45) Date of Patent: Apr. 12, 2016

(54) MOBILE-ACCESS INFORMATION BASED ADAPTATION OF NETWORK ADDRESS LOOKUP FOR DIFFERENTIATED HANDLING OF DATA TRAFFIC

(75) Inventors: Åsa Larsen, Hisings Backa (SE); Reiner Ludwig, Hürtgenwald (DE); Pablo Molinero Fernandez, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 212 days.

(21) Appl. No.: 13/880,238

(22) PCT Filed: Oct. 24, 2011

(86) PCT No.: PCT/EP2011/068573
§ 371 (c)(1),
(2), (4) Date: Apr. 18, 2013

(87) PCT Pub. No.: WO2012/052569
PCT Pub. Date: Apr. 26, 2012

(65) Prior Publication Data
US 2013/0208591 A1    Aug. 15, 2013

Related U.S. Application Data

(60) Provisional application No. 61/405,889, filed on Oct. 22, 2010.

(30) Foreign Application Priority Data

Oct. 22, 2010 (WO) .................. PCT/EP2010/065996

(51) Int. Cl.
*H04W 4/00* (2009.01)
*H04W 72/08* (2009.01)
(Continued)

(52) U.S. Cl.
CPC ......... *H04W 72/087* (2013.01); *H04L 63/0281* (2013.01); *H04L 63/105* (2013.01);
(Continued)

(58) Field of Classification Search
None
See application file for complete search history.

(56) References Cited

U.S. PATENT DOCUMENTS 6,470,029 B1    10/2002  Shimizu
7,310,686 B2 *  12/2007  Uysal .......................... 709/245
(Continued)

FOREIGN PATENT DOCUMENTS

CN    1668024 A    9/2005
CN    1968227 A    5/2007
(Continued)

OTHER PUBLICATIONS

Ekstrom, H. "QoS Contra 1 in the 3GPP Evolved Packet System." IEEE Communications Magazine, IEEE Service Center, Feb. 2009, pp. 76-83, Piscataway, US.
(Continued)

*Primary Examiner* — Kevin C Harper
(74) *Attorney, Agent, or Firm* — Murphy, Bilak & Homiller, PLLC

(57) ABSTRACT

For enabling differentiated handling of mobile network data traffic between a UE (410) and a network resource, a network address lookup procedure is adapted on the basis of mobile access information related to a connection between the UE (410) and a mobile network. The mobile access information may be obtained from authentication traffic (502, 503, 504, 505) in the mobile network and be provided to a node (560) performing the adaptation by modifying a message (508) of the lookup procedure. On the basis of the mobile access information, the adaptation may cause the lookup procedure to return a network address of a replacement network resource capable of handling the data traffic. The network address of the replacement network resource (60) matches a packet filter for directing the data traffic to a bearer established between the UE (410) and the mobile network.

12 Claims, 9 Drawing Sheets

(51) Int. Cl.
    *H04L 29/06*     (2006.01)
    *H04W 12/08*     (2009.01)
    *H04W 12/10*     (2009.01)
    *H04W 28/18*     (2009.01)
    *H04L 29/12*     (2006.01)
    *H04W 8/26*     (2009.01)
    *H04W 74/00*     (2009.01)
    *H04W 76/02*     (2009.01)

(52) U.S. Cl.
    CPC ............. *H04L63/126* (2013.01); *H04W 12/08* (2013.01); *H04W 12/10* (2013.01); *H04W 28/18* (2013.01); *H04L 29/12066* (2013.01); *H04L 61/1511* (2013.01); *H04W 8/26* (2013.01); *H04W 74/006* (2013.01); *H04W 76/02* (2013.01)

(56) References Cited

U.S. PATENT DOCUMENTS

| | | |
|---|---|---|
| 2001/0038609 A1 | 11/2001 | Yamaguchi |
| 2008/0235400 A1 | 9/2008 | Slocombe et al. |
| 2009/0172138 A1* | 7/2009 | Wang et al. .................... 709/223 |
| 2010/0017846 A1 | 1/2010 | Huang et al. |
| 2010/0054222 A1 | 3/2010 | Rune |
| 2010/0128665 A1 | 5/2010 | Kahn |
| 2011/0060838 A1* | 3/2011 | Yeung et al. .................. 709/228 |

FOREIGN PATENT DOCUMENTS

| | | |
|---|---|---|
| CN | 101480002 A | 7/2009 |
| WO | 2006004471 A1 | 1/2006 |
| WO | 2007079773 A1 | 7/2007 |
| WO | 2007087828 A1 | 8/2007 |
| WO | 2007129199 A1 | 11/2007 |
| WO | 2010112077 A1 | 10/2010 |

OTHER PUBLICATIONS

Akamai Technologies, Inc. "Akamai's Application Acceleration Services: Transform the Internet into a Business-Ready Application Delivery Platform." Akamai Technologies, Inc., White Paper, Oct. 2008, pp. 1-12.

* cited by examiner

MOBILE-ACCESS INFORMATION BASED ADAPTATION OF NETWORK ADDRESS LOOKUP FOR DIFFERENTIATED HANDLING OF DATA TRAFFIC

TECHNICAL FIELD

The present invention relates to methods for adaptation of a network address lookup procedure for differentiated handling of data traffic and to corresponding devices.

BACKGROUND

In communication networks, differentiated handling of data traffic may be used to distinguish between different classes of data traffic. For example, a forwarding treatment of data packets, i.e., the way of forwarding a data packet on the way towards its destination, may be controlled to provide a certain Quality of Service (QoS) level, which depends on the traffic class.

For example, in mobile communication networks data traffic related to a specific service may be directed to a bearer offering a certain QoS level. In this respect, a bearer is considered to be an information transmission context or path of defined characteristics, e.g., capacity, delay, and/or bit error rate. Typically, a number of bearers will be established between a gateway of a mobile communication network and a user equipment (UE), e.g., a mobile phone or other type of mobile terminal. A bearer may carry downlink (DL) data traffic in a direction from the network to the UE, and may carry data traffic in an uplink (UL) direction from the UE to the network. In the gateway and in the UE the data traffic, which includes a plurality of IP data packets (IP: "Internet Protocol", which can be the IP Version 4, also referred to as IPv4, or the IP Version 6, also referred to as IPv6) can be filtered, e.g., using IP 5-tuple packet filters, thereby directing the IP data packets to a desired bearer. According to the 3GPP (Third Generation Partnership Project) Technical Specifications (TSs) 23.060 and 24.301, a set of packet filters used to direct the data traffic to a certain bearer.

Further, it is also desirable to apply differentiated handling to data traffic related to specific network resources. For example, data traffic related to a certain network resource, e.g., to a certain internet service or to a certain content provider, may be known to require a specific QoS level. However, it may in some cases be hard to decide on the basis of the data traffic itself which handling is required. On the other hand, differentiated handling could also be implemented on the basis of known network addresses used by these specific network resources. In this case, however, problems may arise if a large number of specific network resources need to be covered, which in turn may use a variety of different network addresses. Therefore rather complex traffic classification rules would need to be defined in order to take into account a large number of arbitrary network addresses. This may specifically be problematic when considering that in some communication network environments there exist limits on the complexity of the traffic classification rules. For example, the 3GPP TSs limit the maximum number of packet filters which can be installed in a TFT of the UE.

Accordingly, there is a need for techniques which allow for efficient differentiated handling of network traffic related to a specific network resource.

SUMMARY

According to an embodiment of the invention, a method for enabling differentiated handling of mobile network data traffic between a UE and a network resource is provided. The data traffic is preceded by a lookup procedure for obtaining a network address of the network resource. According to the method, mobile access information related to a connection of the UE to a mobile network is obtained. On the basis of the mobile access information, a message of the lookup procedure is processed for adapting the lookup procedure to return a network address of a replacement network resource capable of handling the data traffic. The network address matches a packet filter for directing the data traffic to a bearer established between the UE and the mobile network.

According to a further embodiment of the invention, a method for enabling differentiated handling of mobile network data traffic between a UE and a network resource is provided. The data traffic is preceded by a lookup procedure for obtaining a network address of the network resource. According to the method, a message of the lookup procedure is received. The message is then modified by inserting mobile access information related to a connection of the user equipment to a mobile network, and the modified message of the lookup procedure is forwarded.

According to a further embodiment of the invention, a network device is provided. The network device may be used for enabling differentiated handling of mobile network data traffic between a UE and a network resource. The network device is provided with an interface for receiving a message of a lookup procedure for obtaining a network address of a network resource and a processor. The processor is configured to obtain mobile access information related to a connection of the UE to a mobile network and, on the basis of the mobile access information, process a received message of the lookup procedure for adapting the lookup procedure to return a network address of a replacement network resource capable of handling the data traffic. The network address matches a packet filter for directing the data traffic to a bearer.

According to a further embodiment of the invention, a network device is provided. The network device may be used for enabling differentiated handling of mobile network data traffic between a UE and a network resource. The network device is provided with an interface for receiving a message of a lookup procedure for obtaining a network address of a network resource and a processor. The processor is configured to receive a message of the lookup procedure, modify the message of the lookup procedure by inserting mobile access information related to a connection of the UE to a mobile network, and forward the modified message of the lookup procedure.

According to a further embodiment of the invention, a network system is provided. The network system may be used for enabling differentiated handling of mobile network data traffic between a UE and a network resource. The network system includes at least one communication device comprising a packet filter for directing the data traffic to a bearer and a network device. The network device is configured to obtain mobile access information related to a connection of the user equipment to a mobile network and, on the basis of the mobile access information, process a received message of the lookup procedure for adapting the lookup procedure to return a network address of a replacement network resource capable of handling the data traffic. The network address matches a packet filter for directing the data traffic to a bearer.

According to a further embodiment of the invention, a computer program product is provided. The computer program product includes program code to be executed by a processor of a network device. By executing the program code, the network device is caused to operate according to one or more of the above methods.

According to further embodiments, other methods, devices, or computer program products for implementing the methods may be provided.

DETAILED DESCRIPTION OF EMBODIMENTS

Figure 1:
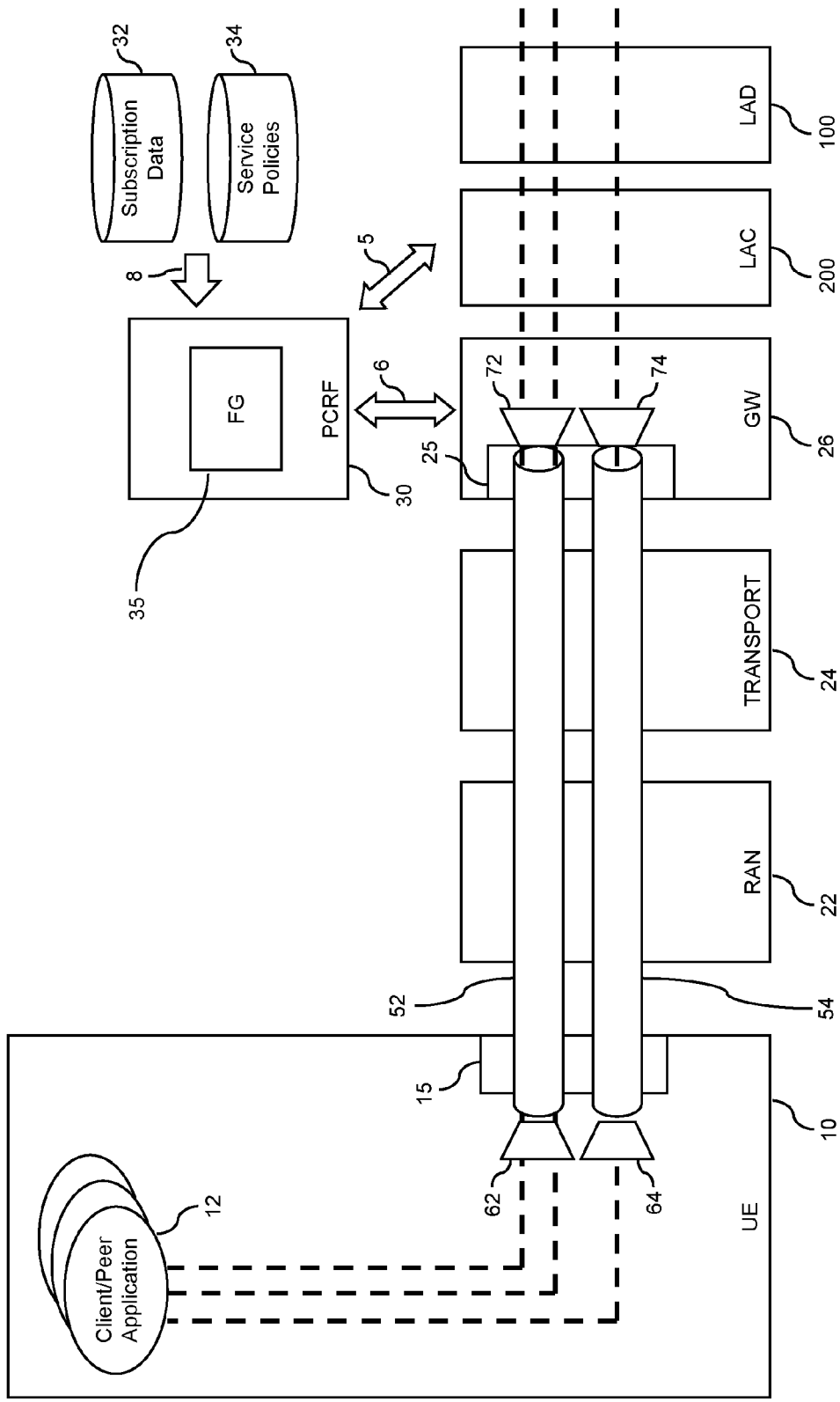
FIG. 1 schematically illustrates a mobile network environment in which concepts according to embodiments of the invention are implemented.

In the following, the invention will be explained in more detail by referring to exemplary embodiments and to the accompanying drawings. The illustrated embodiments relate to concepts for differentiated handling of mobile network traffic. As illustrated in FIG. 1, the concepts are applied in a mobile network according to the 3GPP TSs. However, it is to be understood that the illustrated concepts may be applied in other types of mobile network as well, e.g., using other types of radio access technology.

FIG. 1 schematically illustrates a mobile network environment in which concepts according to embodiments of the invention can be applied.

The communication network environment includes a UE 10, which may also be referred to as a terminal, and a number of network components 22, 24, 26, 30. Among these network components there is a Radio Access Network (RAN) 22. The RAN 22 is based on a certain type or certain types of radio access technology (RAT), e.g., GSM (Global System for Mobile Communications), EDGE (Enhanced Data Rate for GSM Evolution), UMTS (Universal Mobile Telecommunications System), Wideband Code Division Multiple Access (WCDMA), or LTE (Long Term Evolution). Although the RAN 22 is illustrated as a single node, it is to be understood that the RAN 22 may actually be formed of a number of components, which are not further explained herein. The RAN 22 is coupled to a transport node 24, which in turn is coupled to a gateway (GW) 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services to one or more external packet data networks. The gateway 26 may also be a Packet Data Network Gateway (PDN GW).

In addition, the mobile communication network includes a policy controller 30, which is implemented as a Policy and Charging Rules Function (PCRF) according to the 3GPP TSs. The policy controller 30 may be implemented by dedicated hardware and/or comprise software functions executed by a processor. The gateway 26 and the policy controller 30 are typically regarded as components of a core network. The policy controller 30 communicates with the gateway 26 via a signaling path 6, which may be implemented using the Gx interface according to the 3GPP TSs. The policy controller 30 may be further coupled to a subscriber database 32, e.g., a Home Location Register (HLR) or a Home Subscriber server (HSS) according to the 3GPP TSs, and to a service policy database 34 via a signaling path 8, e.g., implemented using a Sp interface according to the 3GPP TSs. The policy controller 30 may thus receive policy data relating to a specific user and/or relating to a specific service available in the mobile communication network, e.g., mobile TV. The policy controller 30 may further communicate with other network functions using a control signaling path 5, which may be implemented using the Rx interface according to the 3GPP TSs.

Among other functions, the policy controller 30 may comprise a filter generator 35. The filter generator 35 is adapted to specify packet filters to be used in the UE 10 and the gateway 26, which may be accomplished on the basis of subscription data from the subscription database 32, service policies from the service policy database 34, and control data received via the signaling path 5. The packet filters are an example of packet classification rules, which in the illustrated example are used to provide different QoS service levels depending on the traffic class.

As further illustrated, data traffic between the network and the UE 10 is carried by a number of bearers 52, 54 established across a radio interface between the UE 10 and the RAN 22. The data traffic typically pertains to one or more client/peer applications 12 running on the UE 10, and may be related to certain network resources, e.g., internet services or content providers. The bearers 52, 54 are established between the UE 10 and the gateway 26. The bearers 52, 54 carry data traffic in both the DL and the UL direction, i.e., may also be regarded as being formed of a DL bearer and a UL bearer. For supporting bidirectional communication on the bearers 52, 54, the UE 10 is provided with a corresponding interface 15 which allows for receiving incoming data packets from the bearers 52, 54 and sending outgoing data packets on the bearers 52, 54. Similarly, the gateway 26 is provided with a corresponding interface 25 which allows for receiving incoming data packets from the bearers 52, 54 and sending outgoing data packets on the bearers 52, 54. The bearers 52, 54 may include a default bearer 52 generally established for offering packet-based services to the UE 10 and one or more dedicated bearer 54 which may have different QoS level, e.g., a higher or lower QoS level, than the default bearer. The default bearer 52 is typically established when the UE 10 attaches to the gateway 26 and receives its IP address and IP connectivity. The dedicated bearer 54 is typically established on demand, e.g., when data packets requiring a certain QoS level need to transmitted. However, in some embodiments dedicated bearers may also be established in advance, e.g., when the UE 10 attaches to the gateway 26. Each bearer 52, 54 may be associated with a corresponding QoS profile. The QoS profile may be defined through parameters such as a QoS Class Identifier (QCI), an Allocation/Retention Priority (ARP), a Traffic Handling Priority (THP), a Maximum Bit Rate (MBR), an Aggregate Maximum Bit Rate (AMBR), and/or a Guaranteed Bit Rate (GBR). Accordingly, a certain QoS level may be provided for communicating data packets between the UE 10 and the gateway 26 by assigning the data packets to a corresponding one of the bearers 52, 54.

In the UE 10, the data packets are routed to a desired bearer 52, 54 using correspondingly configured packet classification rules in the form of UL packet filters 62, 64. In the gateway 26, the data packets are routed to the desired bearers 52, 54 using correspondingly configured packet classification rules in the form of DL packet filters 72, 74. In accordance with the illustrated 3GPP scenario, a set of filters 62, 64, 72, 74 which operates to direct the data packets to a corresponding bearer may also be referred to as a TFT. Parameters of the QoS profile may be signaled from the policy controller 30 to the gateway 26 using the signaling path 6. Similarly, the DL packet filters 72, 74 to be used in the gateway 26 may be signaled from the policy controller 30 to the gateway 26 via the signaling path 6. As regards the UL packet filters 62, 64 used in the UE 10, these may be signaled from the policy controller 30 via the gateway 26 to the UE 10. In some embodiments, at least some of the UL packet filters 62, 64 may be preconfigured in the UE 10 and/or some of the DL packet filters 72, 74 may be preconfigured in the gateway 26. Also, in some embodiments the UL packet filters could be preconfigured in the gateway 26 and be signaled to the UE 10 when it attaches to the gateway 26 or when the corresponding bearer 52, 54 is established. In such embodiments using preconfigured packet filters in the UE 10 and/or in the gateway 26, the policy controller 30 and/or the filter generator 35 of the policy controller 30 could be omitted. In some embodiments, the UL and/or DL packet filters could also be preconfigured in the policy controller 30 and be signaled to the gateway 26 and/or to the UE 10, e.g., when the UE 10 attaches to the gateway 26 or when the corresponding bearer 52, 54 is established.

In the following, concepts according to embodiments of the invention will be explained, which allow for efficiently subjecting the data traffic related to one or more specific network resources to differentiated handling. In this respect, the term "network resource" is intended to cover various types of structures, content, or services which are accessible in the network. In some example, the network resource may be a server on which the service or content is hosted, e.g., under a Uniform Resource Identifier (URI) or Uniform Resource Locator (URL). In some scenarios, the same server may host different network resources. In the example of FIG. 1, these concepts are applied with respect providing a certain QoS level, which is achieved by routing the data packets to the bearers 52, 54 using the packet filters 62, 64, 72, 74 in the UE 10 and in the gateway 26.

The differentiated handling is accomplished on the basis of packet classification rules, which are applied by one or more communication devices, which in the example of FIG. 1 are the UE 10 and the gateway 26. In the example of FIG. 1, packet classification rules are implemented by the packet filters 62, 64, 72, 74. The packet filters 62, 64, 72, 74 are generally configured to operate on the basis of network addresses, which are included in a respective protocol header of the data packets. The network addresses may in particular be IP addresses. For example, when using the Transport Control Protocol (TCP) or the User Datagram Protocol (UDP) for implementing transport of data via the data packets, the protocol header will include IP addresses defining a source network address and a destination network address of the data packet, which can be used separately or in combination as a basis for matching a filter pattern defined in the packet filter 62, 64, 72, 74. Moreover, the above examples of a protocol header will also define a source port number and a destination port number, which can be used separately or in combination as a basis for matching a filter pattern defined in the packet filter 62, 64, 72, 74. In some embodiments, the packet filters 62, 64, 72, 74 may operate on the basis of a pattern for matching an IP-5 tuple (source IP address, destination IP address, source port number, destination port number, protocol ID of the protocol above IP) of the data packets. Further, the packet filters may operate on a filter pattern in which an IP address is be combined with a prefix mask, and/or port numbers are be specified as port ranges. The filter pattern can also be extended by the Type of Service (TOS) (IPv4)/Traffic class (IPv6) and Mask. The filter pattern can also consist of the destination IP address, protocol ID of the protocol above IP, the Type of Service (TOS) (IP Version 4)/Traffic class (IP Version 6) and Mask and the IPSec Security Parameter Index (SPI). The filter pattern can also consist of the destination IP address, the Type of Service (TOS) (IPv4)/Traffic class (IPv6) and Mask and the Flow Label (IPv6). In some embodiments, a value left unspecified in the filter pattern packet filter 62, 64, 72, 74 may match any value of the corresponding information in the data packet, i.e., wildcards may be defined.

In order to reduce complexity of the packet classification rules needed to implement the desired differentiated handling, i.e., of the packet filters 62, 64, 72, 74, the concepts according to embodiments of the invention as explained in the following are based on an adaptation of lookup procedures for obtaining network addresses of the specific network resources for which differentiated handling is implemented. This adaptation is accomplished by processing one or more messages of the lookup procedure. In the illustrated examples, the lookup procedures are based on the Domain Name System (DNS), and the adaptation is accomplished by processing one or more DNS messages, e.g., a DNS query or a response to a DNS query. In other examples, other lookup procedures could be used as well, e.g., a NetBIOS lookup procedure.

The processing of the message or messages of the lookup procedure may involve receiving a query for the network address of the network resource and responding to the query with the network address of the replacement network resource. Further, this processing may involve receiving a response to a query for the network address of the network resource and modifying the response by replacing the network address of the network resource with the network address of the replacement network resource. Further, this processing may also involve redirecting a query for the network address of the network resource. The processing is based on mobile access information of or related to a connection of the UE 10 to the mobile network. The network address as returned by the adapted lookup procedure may be selected depending on the mobile access information. The mobile access information includes information which is accessible to the mobile network or can be provided by the mobile network. In the mobile network, the mobile access information can be used for establishing, controlling, and/or maintaining the connection to the UE 10. For example, such information may be a mobile network subscriber identifier used by the UE 10 for connecting to the mobile network, e.g., an International Mobile Subscriber Identity (IMSI) or a Mobile Subscriber Integrated Services Digital Network Number (MSISDN), a hardware identifier of the UE 10, e.g., an International Mobile Equipment Identity (IMEI), a RAT identifier indicating a radio access technology used by the UE 10 for connecting to the mobile network, a mobile network gateway address of a gateway used by the UE 10 for connecting to the mobile network, e.g., a Serving Gateway Support Node (SGSN) address, and/or a location of the user equipment, e.g., in terms of a mobile network cell to which the UE 10 is connected or in terms of geographical coordinates.

More specifically, the illustrated concepts apply to scenarios in which data traffic related to a specific network resource is preceded by a lookup procedure for obtaining a network address of this network resource. The lookup procedure is adapted by processing of one or more messages of the lookup procedure in such a way that the lookup procedure returns a network address of a replacement network resource capable of handling the data traffic, e.g., by sending requested data or storing uploaded data. For example, the replacement network resource may be configured with this capability by operating as a proxy node with respect to the network resource. The replacement network resource may also cache content provided by the network resource. In some embodiments, the replacement network resource may be a cache server or a tunnel edge server for delivering the content of the network resource.

In this connection, the mobile access information allows for determining the replacement network resource depending on the particular circumstances of establishing the connection to the mobile network. For example, different types of replacement network resources could be provided, e.g., a cache and a tunnel edge server, and the adaptation of the lookup procedure could be used to select between these different types of replacement network resources. Also, the adaptation of the lookup procedure could be used to select whether a certain replacement network resource is used or not. For example, the adaptation of the lookup procedure could be used to select that the data traffic of one type of UE, e.g., as identified by its IMEI, is transferred through a cache, while the data traffic of another type of UE, e.g., as identified by its IMEI, is transferred directly. In the latter case, the lookup procedure could be adapted to return a network address directly corresponding to the network resource.

If the lookup procedure returns the network address of the replacement network resource, communication of data packets may be established with respect to the replacement network resource, and differentiated handling of the data packets may be accomplished on the basis of the network address of the replacement network resource, i.e., by using packet filters matching the network address of the replacement network resource. Accordingly, the differentiated handling of the data packets can be facilitated by suitably selecting the network address of the replacement network resource. For this purpose, the replacement network resource may be located in the same local network as communication device, e.g., the UE 10, to which the communication is established. A network operator of the local network may therefore suitably assign the network address to the replacement network resource. For example, the network address may be selected from a private network address range, e.g., as defined in RFC 1918, RFC 4193, or RFC 5735. However, the network address could also be selected from a specific range of public network addresses, e.g., allocated to the network operator.

For example, the network address of the replacement network resource may be selected from a network address range corresponding to a subnet. In this case, the packet classification rule operating on the basis of this network address may be provided with a simple structure. For example, the filter pattern as used by one or more of the packet filters 62, 64, 72, 74 may define the network address to be matched by using a wildcard, thereby achieving that every network address within this subnet will match the filter pattern. As can be seen, it is therefore possible to efficiently define a packet classification rule to provide the same handling for all network addresses from this subnet. This could be used to provide a specific handling for a number of specific network resources by assigning the replacement network resources for these network resources network addresses from the same subnet. According to a further example, also differentiation between the data traffic of different network resources can be implemented by selecting the network addresses of the corresponding replacement network resources each from a different network range corresponding to a subnet. A corresponding packet classification rule may be defined for each subnet, thereby allowing to individually define a corresponding handling of the related data traffic. Accordingly, in some embodiments the network address of the replacement network address can be selected in accordance with a traffic class of the data traffic related to the network resource. In particular, each traffic class may be assigned to a corresponding network address range, e.g., a subnet, and the network address of the replacement network resource may be selected from the network address range corresponding to the traffic class of the data traffic related to the network resource.

In order to implement the above concepts, the mobile network environment of FIG. 1 further includes a lookup adaptation device (LAD) 100. In addition, a lookup adaptation controller (LAC) 200 may be provided. Typically, the lookup adaptation device 100 will receive lookup messages pertaining to the data traffic related to the specific network resource. In some embodiments, the lookup adaptation device 100 may be arranged in such a way that lookup messages pertaining to the data traffic of the UE 10 are routed through the lookup adaptation device 100. For example, this could be accomplished by arranging the lookup adaptation device 100 in a data path between the gateway 26 and a local DNS server (not illustrated in FIG. 1). Similarly, the lookup messages may be routed through the lookup adaptation controller 200. In some embodiments the lookup adaptation device 100 may be part of the gateway 26. In some embodiments, the lookup adaptation device 100 could also be part of the local DNS server. According to still further embodiments, the lookup adaptation device could also be arranged in a data path between the local DNS server and an external DNS server. Further, in some embodiments the lookup adaptation device 100 may also be part of an external DNS server, i.e., located outside the mobile network. The lookup adaptation device 100 may be implemented within other network devices, e.g., the gateway 26 or the local DNS server, or as a standalone network device. The functionalities of the lookup adaptation device 100 may be implemented by software by having a processor (not illustrated in FIG. 1) of the lookup adaptation device 100 execute suitably configured program code and use suitably configured lookup adaptation data. As an alternative, the lookup adaptation device 100 may at least in part be implemented by dedicated hardware. The lookup adaptation controller 200 may be used to provide at least a part of the lookup adaptation data to the lookup adaptation device 100. In particular, the lookup adaptation controller 200 may be used to provide the mobile access information to the lookup adaptation device 100. This may in particular be useful in scenarios where the lookup adaptation device 100 is located outside the mobile network, e.g., is implemented in an external DNS server. The lookup adaptation controller 200 could in turn be provided inside the mobile network, e.g., within the core network. Alternatively, the lookup adaptation controller 200 could be located outside the mobile network, but with access to certain information within the mobile network, e.g., by being provided with access to control signaling in the mobile network, such as authentication messages.

In some embodiments, the network address of the replacement network resource may be selected in such a way that it matches a preconfigured packet classification rule operating on the basis of this network address. In this way, no individual procedures for generating and/or signaling the packet classification rules are necessary. For example, in the mobile communication network environment of FIG. 1, the packet filters 62, 64 could be preconfigured in the UE 10, and/or the packet filters 72, 74 could be preconfigured in the gateway 26. Also, the packet filters 62, 64 could be preconfigured in the gateway 26 and then signaled to the UE 10. Further, the packet filters 62, 64, 72, 74 could be preconfigured in the policy controller 30 and the be signaled to the gateway 26 and/or to the UE 10. The preconfiguration could be obtained, e.g., by providing the packet classification rules together with an operating software of the communication device which is to perform differentiated handling on the basis of these packet classification rules, or by using maintenance procedures to provide the packet classification rules to the communication device. In some embodiments such preconfigured packet classification rules may be updated in response to inspecting the data packets, thereby allowing for a refined differentiation, e.g., between different classes of data traffic related to the same network resource or between data traffic related to different network resources using the same replacement network resource.

In some embodiments, a packet classification rule operating on the basis of the network address of the replacement network resource may also be dynamically generated in response to selecting the network address of the replacement network resource, or an existing packet classification rule may be modified in response to selecting the network address of the replacement network resource. In the example of FIG. 1, the lookup adaptation controller 200 may use the signaling path 5 to the policy controller 30 to initiate generation of new packet filters to be used by the UE 10 and/or by the gateway 26 or to initiate modification of the existing packet filters 62, 64, 72, 74, which in each case may be accomplished by the filter generator 35 of the policy controller 30.

Figure 2:
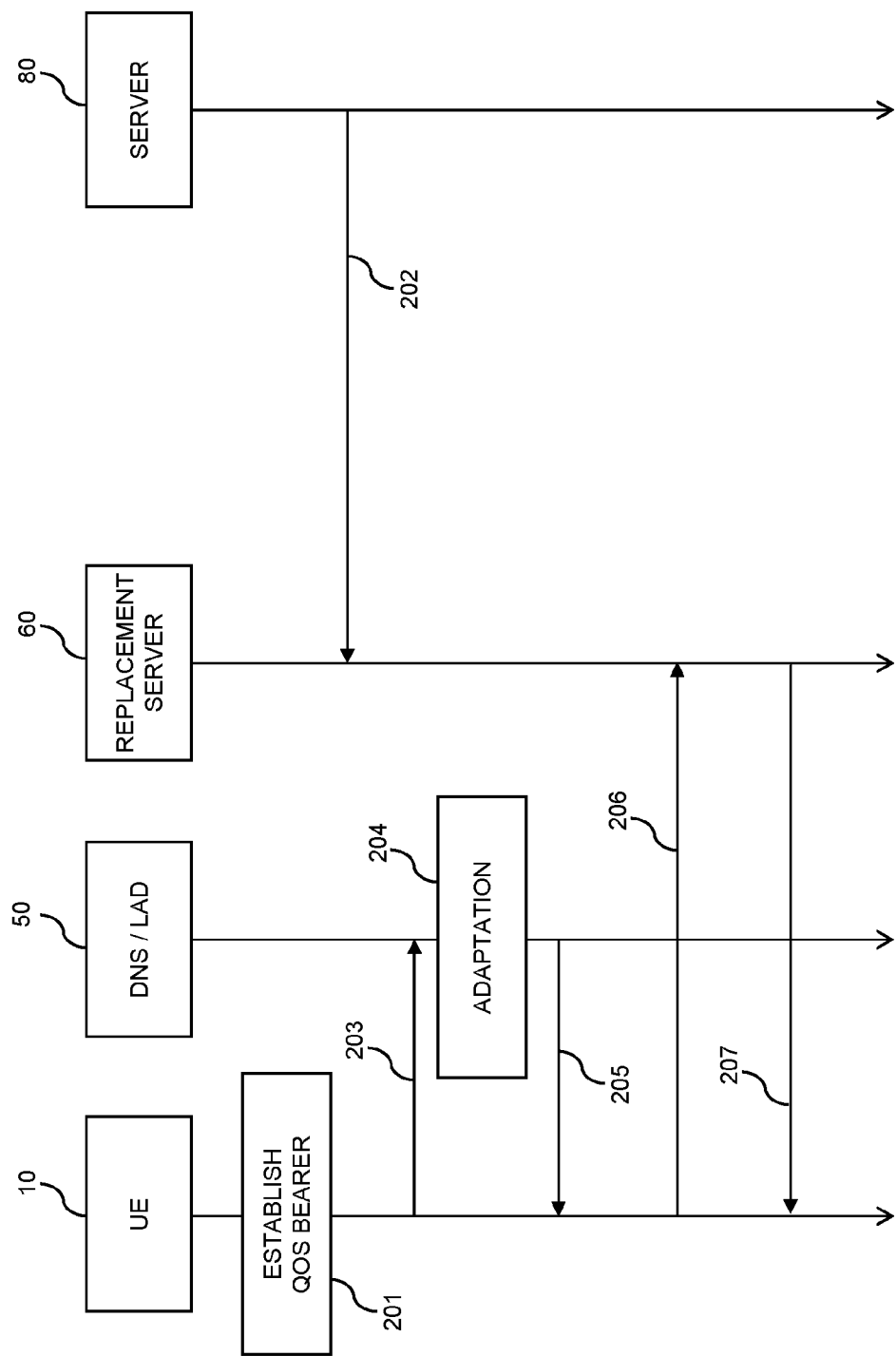
FIG. 2 shows a signaling diagram for illustrating an exemplary scenario of applying differentiated handling of data traffic according to an embodiment of the invention.

FIG. 2 shows a signaling diagram for illustrating an exemplary scenario in which differentiated handling of data traffic is provided by adapting a lookup procedure in accordance with the above concepts. The signaling diagram of FIG. 2 shows the UE 10, a local DNS server 50, a replacement server 60, and a server 80. The above-described functionality of the lookup adaptation device is implemented within the local DNS server 50. That is to say, the lookup adaptation device 100 of FIG. 1 may be part of the local DNS server 50.

In the scenario of FIG. 2, the server 80 represents an example of a specific network resource for which the related data traffic is to be subjected to differentiated handling in communication with respect to the UE 10. For example, the server 80 may provide one or more specific internet service or may be part of a content delivery system used for efficient delivery of content. As explained in connection with FIG. 1, this differentiated handling may have the purpose of providing a certain QoS level for the data traffic, which can be obtained by routing data packets of this data traffic to a corresponding bearer, e.g., one of the bearers 52, 54, in particular the dedicated bearer 54. The replacement server 60 functions as a replacement network resource for the server 80. The replacement server 60 is capable of replacing the server 80 in communication with the UE 10, i.e., can handle the data traffic in place of the server 80. In particular, the replacement server 60 is capable of responding to requests from the UE 10 in the same way as the server 80. For this purpose, the replacement server 60 may operate a proxy node with respect to the server 80, e.g., by relaying the requests to the server 80 and forwarding responses from the server 80 to the UE 10, and/or may cache content provided by the server 80. In some cases, an acceleration tunnel may be provided for communication between the replacement server 60 and the server 80. In such cases, the replacement server may function as tunnel edge server and accomplish, e.g., encapsulation of data packets to be transmitted via the acceleration tunnel to the server 80 and decapsulation of data packets received via the acceleration tunnel from the server 80. In some embodiments, proxy node operation, cache server operation, and tunnel edge server operation of the replacement server 60 may be combined.

Moreover, it is assumed that the UE 10 is attached to a mobile network using a certain RAT type, e.g., as illustrated in FIG. 1, and that the local DNS server 50 and the replacement server 60 are part of this mobile network, i.e., controlled by the same network operator. The network operator may have allocated a certain range of network addresses to be used by replacement network resources, e.g., a range of private network addresses, and the replacement server 60 has a network address which is selected from this range.

At step 201, a bearer to be used by the data traffic related to the server 80 is established, e.g., the dedicated bearer 54. The bearer may be established to offer a certain QoS level, thereby allowing to treat the data traffic, e.g., as premium traffic or trash traffic. The bearer may be already be established when the UE 10 attaches to the mobile communication network. Alternatively, the bearer could also be established in response to first detecting the data traffic related to the server 80. The packet filters to be used for routing the data traffic to the bearer are configured to operate on the basis of the network address assigned to the replacement server 60. In particular, the UL packet filters to be used in the UE 10 are configured to route UL data packets directed to the network address of the replacement server to the bearer, and the DL packet filters to be used in the gateway to which the UE 10 is attached, e.g., the gateway 26 of FIG. 1, are configured to route DL data packets coming from the network address of the replacement server to the bearer. The packet filters may be preconfigured in the UE 10 or in the gateway, and the network address of the replacement server 60 may be selected to match these preconfigured packet filters. Alternatively, the packet filters could be generated in response to selecting the network address of the replacement server. In each case, the signaling needed to establish the bearer is limited. Moreover, network addresses of other replacement servers corresponding to other servers could be assigned in such a way that a simple filter structure is obtained.

As illustrated at 202, the server 80 transmits data to the replacement server 60. Depending on the operation of the replacement server 60, this may be accomplished at any suitable time. For example, the transmission could be triggered by new data becoming available at the server 80 or by a request for the data by another client. Such a request could be first received by the replacement server 60 which, if the data is not locally available, then forwards the request to the server 80. The replacement server 60 may then store the received data so as to be used for responding to subsequent requests. In proxy node operation, e.g., as a tunnel edge server, the transmission of the data from the server 80 to the replacement server 60 is triggered by the requests of the UE 10 which are relayed by the replacement server 60 to the server 80.

When the UE 10 now needs to access the server 80, it first issues a DNS query 203 to the local DNS server 50. The DNS query 203 specifies a hostname or URI associated with the server 80 to request the network address of the server 80. The local DNS server 50, which includes the lookup adaptation functionality, then performs an adaptation step 204 before responding to the DNS query with a message 205. The adaptation step 204 is accomplished on the basis of mobile access information of the connection between the UE 10 and the mobile network, e.g., an IMEI of the UE 10. Depending on the mobile access information, the adaptation step 204 may cause the DNS query 203 to be processed in such a way that the message 205 indicates the network address of the replacement server 60. In this case, the adaptation step 204 causes the lookup procedure to return the network address of the replacement server 60. Depending on the mobile access information, the adaptation step 204 may also cause the lookup procedure to return the network address of another replacement server or the network address of the server. The adaptation step 204 may be implemented by corresponding configuration of resource records as stored by the local DNS server 50 for the hostname or URI associated with the server 80. The configuration of the resource records may be based on suitably configured lookup adaptation data relating the hostname and/or URI associated with the server 80 to the network address of the replacement server 60. Depending on the mobile access information, different sets of lookup adaptation data may be applied at adaptation step 204.

Assuming that adaptation step 204 was performed to return the network address of the replacement server 60, the UE 10 then sends a request 206 to the replacement server 60 to request the data, and the replacement server 60 sends a response 207 with the requested data to the UE 10. The data packets of the request 206 will indicate the network address of the replacement server 60 as their destination address and therefore be directed to the bearer established at step 201 by the UL packet filters of the UE 10. Similarly, the data packets of the response 207 will indicate the network address of the replacement server 60 as their destination address and therefore be directed to the bearer established at step 201 by the DL packet filters of the gateway to which the UE 10 is attached.

For subsequent data traffic related to the server 80, no new DNS query by the UE 10 is needed as long as the network address of the replacement server 60 is cached by the UE 10. Such traffic would directly be routed to the replacement server 60.

It is to be understood that the lookup procedure of FIG. 2 could be modified in various manners. For example, the DNS query 203 could be redirected by the local DNS server 50 to an external DNS server, e.g., to a DNS server which is authoritative for the domain of the server 80. This redirection could be in one ore more steps. The adaptation of step 204 could then also be accomplished by the external DNS server. This external DNS server may however be hosted by the network operator of the mobile communication network. In such cases, the lookup procedure could also include further steps to optimize the delivery of content, e.g., steps for selecting cache clusters or cache servers.

In some scenarios, the lookup procedure of FIG. 2 may also be iterative. In such scenarios, the local DNS server 50 may respond to the UE 10 with a message indicating a further DNS server to which the DNS query should be sent in the next step. The UE 10 then sends the DNS query to the further DNS server to obtain the requested network address, or information on a still further DNS server to which the DNS query is to be sent in the next step. This may be iterated until the DNS query arrives at a DNS server which responds to the DNS query with the network address of the replacement server 60. This DNS server, which sends the final response to the query, may be an external DNS server, e.g., a DNS server which is authoritative for the domain of the server 80. However, this external DNS server may be hosted by the network operator of the mobile communication network.

Also, the message 205 returned to the UE 10 could indicate not only the network address of the replacement server 60, but also additional network addresses associated with the replacement server or further replacement servers. To these further replacement servers, the corresponding network addresses may be assigned in such a way that they match the packet filters of the bearer established at step 201. Further, the DNS query 203 and the message 205 returned to the UE in response to the DNS query 203 could be routed to the bearer established at step 201 by generating the packet filters of the bearer to match all data packets indicating port number 53 as source or destination port.

Figure 3:
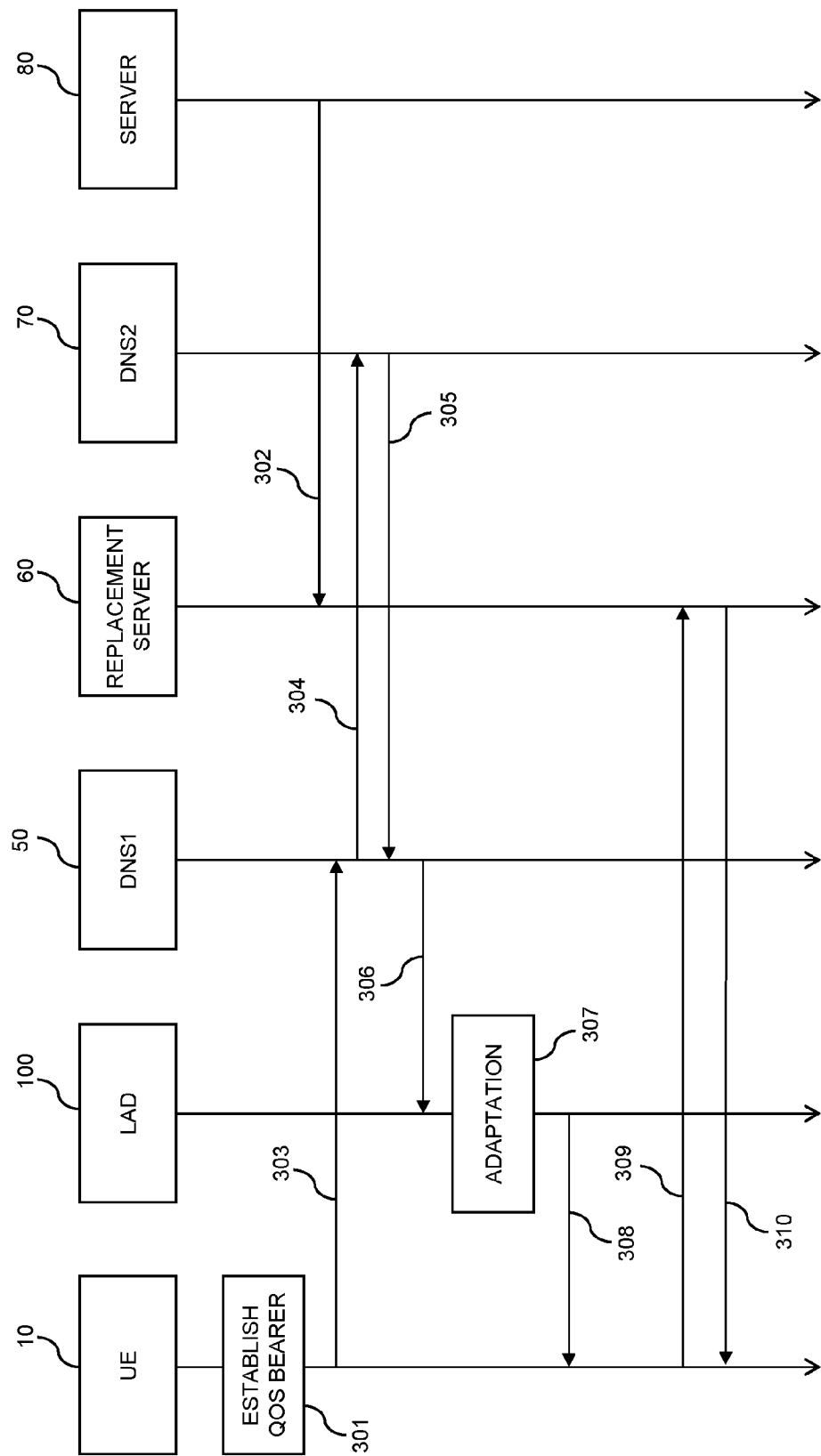
FIG. 3 shows a signaling diagram for illustrating a further exemplary scenario of applying differentiated handling of data traffic according to an embodiment of the invention.

FIG. 3 shows a signaling diagram for illustrating a further exemplary scenario in which differentiated handling of data traffic is provided by adapting a lookup procedure in accordance with the above concepts. In this scenario, the adaptation is based on an interception of a message transmitted in response to a DNS query. The signaling diagram of FIG. 3 shows the UE 10, the lookup adaptation device 100, a local DNS server 50, a replacement server 60, an external DNS server, and a server 80. The lookup adaptation device 100 is illustrated to be arranged between the UE 10 and the local DNS server 50. For example, the lookup adaptation device 100 could be implemented within or collocated with the gateway to which the UE 10 is attached, e.g., the gateway 26 of FIG. 1.

In the scenario of FIG. 3, the server 80 represents an example of a specific network resource for which the related data traffic is to be subjected to differentiated handling in communication with respect to the UE 10. For example, the server 80 may provide one or more specific internet service or may be part of a content delivery system used for efficient delivery of content. As explained in connection with FIG. 1, this differentiated handling may have the purpose of providing a certain QoS level for the data traffic, which can be obtained by routing data packets of this data traffic to a corresponding bearer, e.g., one of the bearers 52, 54, in particular the dedicated bearer 54. The replacement server 60 functions as a replacement network resource for the server 80. The replacement server 60 is capable of replacing the server 80 in communication with the UE 10, i.e., can handle the data traffic in place of the server 80. In particular, the replacement server 60 is capable of responding to requests from the UE 10 in the same way as the server 80. For this purpose, the replacement server 60 may operate a proxy node with respect to the server 80, e.g., by relaying the requests to the server 80 and forwarding responses from the server 80 to the UE 10, and/or may cache content provided by the server 80. In some cases, an acceleration tunnel may be provided for communication between the replacement server 60 and the server 80. In such cases, the replacement server may function as tunnel edge server and accomplish, e.g., encapsulation of data packets to be transmitted via the acceleration tunnel to the server 80 and decapsulation of data packets received via the acceleration tunnel from the server 80. In some embodiments, proxy node operation, cache server operation, and tunnel edge server operation of the replacement server 60 may be combined.

Moreover, it is assumed that the UE 10 is attached to a mobile network using a certain RAT type, e.g., as illustrated in FIG. 1, and that the local DNS server 50 and the replacement server 60 are part of this mobile network, i.e., controlled by the same network operator. The network operator may have allocated a certain range of network addresses to be used by replacement network resources, e.g., a range of private network addresses, and the replacement server 60 has a network address which is selected from this range. The external DNS server 70 may be, e.g., a DNS server which is authoritative for the domain of the sever 80.

At step 301, a bearer to be used by the data traffic related to the server 80 is established, e.g., the dedicated bearer 54. The bearer may be established to offer a certain QoS level, thereby allowing to treat the data traffic, e.g., as premium traffic or trash traffic. The bearer may already be established when the UE 10 attaches to the mobile communication network. Alternatively, this the bearer could also be established in response to first detecting the data traffic related to the server 80. The packet filters to be used for routing the data traffic to the bearer are configured to operate on the basis of the network address assigned to the replacement server 60. In particular, the UL packet filters to be used in the UE 10 are configured to route UL data packets directed to the network address of the replacement server to the bearer, and the DL packet filters to be used in the gateway to which the UE 10 is attached, e.g., the gateway 26 of FIG. 1, are configured to route DL data packets coming from the network address of the replacement server to the bearer. The packet filters may be preconfigured in the UE 10 or in the gateway, and the network address of the replacement server 60 may be selected to match these preconfigured packet filters. Alternatively, the packet filters could be generated in response to selecting the network address of the replacement server. In each case, the signaling needed to establish the bearer is limited. Moreover, other network addresses of other replacement servers corresponding to other servers could be assigned in such a way that a simple filter structure is obtained.

As illustrated at 302, the server 80 transmits data to the replacement server 60. Depending on the operation of the replacement server 60, this may be accomplished at any suitable time. For example, the transmission could be triggered by new data becoming available at the server 80 or by a request for the data by another client. Such a request could be first received by the replacement server 60 which, if the data is not locally available, then forwards the request to the server 80. The replacement server 60 may then store the received data so as to be used for responding to subsequent requests. In proxy node operation, e.g., as a tunnel edge server, the transmission of the data from the server 80 to the replacement server 60 is triggered by the requests of the UE 10 which are relayed by the replacement server 60 to the server 80.

When the UE 10 now needs to access the server 80, it first issues a DNS query 303 to the local DNS server 50. The DNS query 303 specifies a hostname or URI associated with the server 80 to request the network address of the server 80. It now assumed that the local DNS server 50 is not capable of responding to the DNS query 303 and therefore issues a further DNS query 304 to the external DNS server 70. The external DNS server 70 responds to the local DNS server 50 with a message 305 indicating the network address of the server 80. The local DNS server 50 then issues a message 306 indicating the network address of the server 80 toward the UE 10. The message 306 is intercepted by the lookup adaptation device 100 and modified at adaptation step 307. Adaptation step 307 is accomplished on the basis of mobile access information of the connection between the UE 10 and the mobile network, e.g., an IMEI of the UE 10. Depending on the mobile access information, the adaptation step 307 may cause the network address of the server 80 to be replaced with the network address of the replacement server 60. In this case, the adaptation step 307 causes the lookup procedure to return the network address of the replacement server 60. Depending on the mobile access information, the adaptation step 307 may also cause the network address in message 306 to be left unchanged or to be replaced by the network address of another replacement server. The lookup adaptation device 100 then forwards the message 308 as generated at adaptation step 307, which may be modified or unmodified, to the UE 10. Depending on the mobile access information, the adaptation step 307 may thus cause the lookup procedure to return the network address of the replacement server 60. The adaptation step 307 may be implemented by providing the lookup adaptation device 100 with suitably configured lookup adaptation data relating the network address, hostname, and/or URI associated with the server 80 to the network address of the replacement server 60. Depending on the mobile access information, different sets of lookup adaptation data may be applied at adaptation step 204.

Assuming that adaptation step 307 was performed to return the network address of the replacement server 60, the UE 10 then sends a request 309 to the replacement server 60 to request the data, and the replacement server 60 sends a response 310 with the requested data to the UE 10. The data packets of the request 309 will indicate the network address of the replacement server as their destination address and therefore be directed to the bearer established at step 301 by the UL packet filters of the UE 10. Similarly, the data packets of the response 310 will indicate the network address of the replacement server as their destination address and therefore be directed to the bearer established at step 301 by the DL packet filters of the gateway to which the UE 10 is attached.

For subsequent data traffic related to the server 80, no new DNS query by the UE 10 is needed as long as the network address of the replacement server 60 is cached by the UE 10. Such traffic would directly be routed to the replacement server 60.

It is to be understood that the lookup procedure of FIG. 3 could be modified in various manners. For example, the redirection of the DNS query to the external DNS server could include one or more further redirection processes. Further, the lookup procedure could also include further steps to optimize the delivery of content, e.g., steps for selecting cache clusters or cache servers. Also, the lookup adaptation device 100 could intercept a response to a DNS query at a different position. For example, the lookup adaptation device 100 could be arranged between the local DNS server 50 and the external DNS server 70 and intercept the message 305.

In some scenarios, the lookup procedure of FIG. 3 may also be iterative. In such scenarios, the local DNS server 50 may respond to the UE 10 with a message indicating a further DNS server to which the DNS query should be sent in the next step. The UE 10 then sends the DNS query to the further DNS server to obtain the requested network address, or information on a still further DNS server to which the DNS query is to be sent in the next step. This may be iterated until the DNS query arrives at a DNS server which responds to the DNS query with the network address of server 80. This final response would then be intercepted by the lookup adaptation device 100 and modified as explained for adaptation step 307.

Also, the message 308 returned to the UE 10 could indicate not only the network address of the replacement server 60, but also additional network addresses associated with the replacement server or further replacement servers. To these further replacement servers, network addresses may be assigned which match the packet filters of the bearer established at step 301. Further, the DNS query 303 and the message 308 returned to the UE in response to the DNS query 303 could be routed to the bearer established at step 301 by generating the packet filters of the bearer to match all data packets indicating port number 53 as source or destination port.

In the scenarios of FIGS. 2 and 3, the step of establishing the bearer can depend on further conditions. For example, the bearer could be established only for certain types of UE, e.g., on the basis of the IMEI of the UE 10. Further, the bearer could be established only for certain subscribers, e.g., based on information in the subscriber database 32 of FIG. 1. Further, the bearer could be established only in certain parts of the network, e.g., based on the location of the UE 10. Further, the bearer could be established only for certain radio access technologies the UE 10 uses for attaching to the mobile communication network, e.g., on the basis of the type of the RAN 22 in FIG. 1. If the bearer is not established, the data traffic may be handled in the usual manner, e.g., be routed to the default bearer 52. Also, if the adaptation steps 204 or 307 return the network address of the server 80, the subsequent data traffic between the UE 10 and the server 80 could be routed to the default bearer 52.

In the above described concepts, differentiated handling can be implemented in a variety of ways. For example, data traffic related to a plurality of different network resources could be handled in the same way by providing a corresponding replacement network resource for each of the network resources and by selecting the network addresses of the replacement network resources in such a way that the packet classification rule(s) operating thereon can be provided with a simple structure, e.g., by selecting the network addresses from the same subnet or from a contiguous range of network addresses.

Also, the data traffic related to a first set of network resources could be handled differently from that related to a second set of network resources by providing a corresponding replacement network resources for each of the network resources and by selecting the network addresses of the replacement network resources in such a way that the packet classification rules operating thereon can be provided with a simple structure, e.g., by selecting the network addresses of the replacement network resources corresponding to the first set from different subnets or from different contiguous ranges of network addresses than the network addresses of the replacement network resources corresponding to the second set. Typically different packet classification rules may then be defined for the first and second set. For example, different sets of packet filters could be defined in order to route the data traffic related to the first set to another bearer, e.g., to another dedicated bearer, than the data traffic related to the second set. For example these two bearers could be dedicated bearers having different QoS levels. However, this also includes the possibility of providing no explicit packet classification rule for one set of network resources and corresponding replacement network resources. In the example of FIG. 1, this would cause the data traffic related to this set to be routed to the default bearer.

In some embodiments, the same replacement network resource may be used to provide two or more different ways of handling the data traffic. For example, this can be achieved by assigning two or more network addresses to the same replacement network resource, each of the network addresses being selected from a range associated with a different way of handling the data traffic, e.g., from different subnets. In some embodiments, two or more network addresses of the same replacement network resource can also be used for differentiating between the data traffic respectively related to different network resources which are associated with this same replacement network resource.

Figure 4:
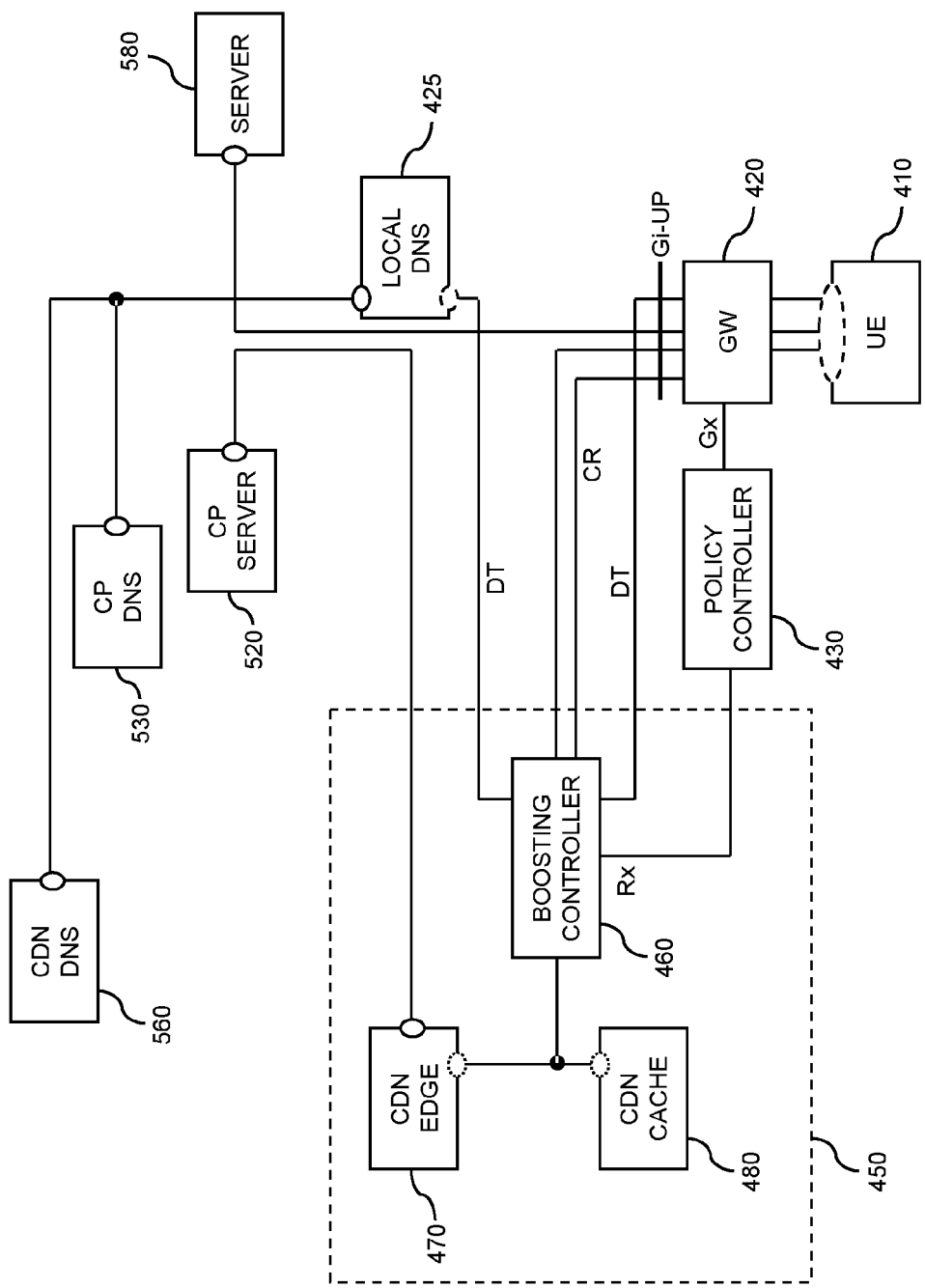
FIG. 4 shows a mobile network environment implementing in a content booster architecture in which concepts according to embodiments of the invention can be applied.

FIG. 4 shows a communication network environment with a content booster architecture, in which the above concepts of mobile access information based adaptation of the network address lookup procedure may be applied. The purpose of the content booster architecture is to offer an improved QoE in content delivery from one or more content providers, which are an example of the network resources 80 as illustrated in FIG. 1. As illustrated, the content booster architecture includes infrastructure of a mobile broadband (MBB) operator, i.e., a GW 420 to which a UE 410 may attach, a policy controller 430, a local DNS server 425, and an Internet Peering Point Gi-UP. Co-located with this infrastructure is a content booster infrastructure 450, which includes a boosting controller 460. Further, the content booster infrastructure 450 includes an edge server 470 of a CDN and/or a cache server 480 of a CDN. The purpose of the edge server 470 and the cache server 480 is to accelerate delivery of content from a content provider (CP) server 520 to the GW 420 by acting as a local proxy and a local cache, respectively. Further, the co-location with the infrastructure of the MBB operator also allows for accelerating content delivery from the GW 420 to the UE 10.

In addition, FIG. 4 also illustrates a CP DNS server 530, an external CDN DNS server 560, and an external server 580, e.g., any type of Internet server. It is to be understood that the content booster infrastructure 450 may actually have interfaces towards a plurality of MBB networks, CPs, and CDNs.

In general terms, the idea of the content booster architecture is to perform differentiated handling of data traffic on a communication path using the content booster infrastructure acting as a broker. The broker may have service agreements on the one hand with one or more CPs, e.g., with an Internet auction provider, and on the other hand with one or more MBB operators who in turn have associated subscribers with respective UEs. The CPs may also have agreements with CDN providers to host content so that it can transmitted in a differentiated way, e.g., with higher QoS, to users. The broker may control upgrades or downgrades for priority of traffic between the GW 420 and the UE 410. For this purpose, the boosting controller 460 can inspect end user content request messages, inspect end user DNS replies, keep track of charging and service agreement fulfillment, trigger a priority upgrade request, or trigger a priority downgrade request. For these purposes the boosting controller 460 and in general the content booster architecture 450 may comprise interfaces as depicted in FIG. 4. More specifically, the boosting controller 460 may have an interface with respect to the policy controller 430 in order to downgrade or upgrade priority of traffic, e.g., by initiating bearer control procedures. As illustrated, this interface may be implemented as the Rx interface according to the 3GPP TSs. Further, the boosting controller 460 may have an interface for receiving and forwarding DNS traffic DT between the GW 420 and the local DNS 425. This allows the boosting controller 460 to supplement messages of the DNS traffic DT with additional information available at the boosting controller, in particular with mobile access information. Further, this may allow the boosting controller 460 to identify whether a DNS request is for content from a peered CP requiring prioritized delivery of content by the content boosting infrastructure 450. Further, the boosting controller 460 may have an interface with respect to the GW 420 for receiving copied authentication signaling CR with respect to the GW 420, e.g., signaling according to the RADIUS protocol or the DIAMETER protocol. By receiving the copied authentication signaling, the boosting controller 460 may obtain mobile access information of the connection between the UE 410 and the mobile network, e.g., IMEI, MSISDN, IMSI, SGSN address, location of the UE 410, or the like. Here, it is to be understood that also various other types of mobile access information could be obtained from the copied authentication signaling CR. In the illustrated scenario, the boosting controller 460 may provide the obtained mobile access information to another entity which performs the lookup adaptation. In the illustrated scenario, this is assumed to be the CDN DNS server 560. In other words, in the scenario of FIG. 4, the lookup adaptation device 100 as explained above is assumed to be implemented at the CDN DNS server 560. In other embodiments, the lookup adaptation device 100 could be implemented at some other instance, e.g., at the local DNS server 425, at the CP DNS server 520, or as a standalone node in the data path of the DNS traffic DT.

Moreover, the boosting controller 460 may be provided with an interface to the edge server 470 and/or to the cache server 480, as well as an interface with respect to the GW 420. The latter interfaces have the purpose of routing traffic between the edge server 470 and/or cache server 480 and the GW 420 through the boosting controller. This traffic comprises the selected data traffic to be prioritized.

The edge server 470 in turn may be provided with an external packet interface with respect to the CP server 520, which allows the edge server 470 to obtain content data for delivery to UEs connected to the GW 420, and an internal packet interface with respect to the boosting controller 460 and the cache server 480. Similarly, the cache server 480 may be provided with an internal packet interface with respect to the boosting controller 460 and the edge server 470. The internal packet interface of the cache server 480 allows the cache server 480 to cache content data obtained by the edge server 470 and to provide cached content data via the boosting controller 460 and the GW 420 to UEs. In some implementations, e.g., in implementations without the edge server 470, the cache server 480 could also be provided with an external packet interface with respect to the CP server 520, which would allow the cache server 480 to directly obtain content data for delivery to UEs connected to the GW 420.

Here, it is to be noted that the internal packet interfaces of the above components of the content boosting infrastructure 450 are preferably implemented with network addresses from a specific range, e.g., IP addresses from a private subnet. Accordingly, it is possible to efficiently differentiate between traffic from the content booster infrastructure 450 and other traffic, e.g., from the server 580, using the network addresses in the data packets of the traffic. More specifically, the GW 420 and/or the UE 410 may use packet filters matching the network addresses from the specific range.

In some implementations, the components of the content boosting infrastructure 450 may be configured with two different specific ranges of network addresses, e.g., IP addresses from two different private subnets. One specific range may then be associated with peered CPs requiring prioritized delivery of content while the other specific range may be associated with peered CPs not requiring prioritized delivery of content or a different level of prioritization.

The CDN DNS server 560 may be configured to resolve a DNS request towards peered CPs accordingly. For example, it may return a corresponding address from the specific range or ranges of network addresses used by the content boosting infrastructure. The CDN DNS 560 may identify the MBB operator by the network address of the local DNS 425.

As mentioned above, the above concepts of mobile access information based adaptation of the network address lookup may be implemented at the CDN DNS server 560. That is to say, the CDN DNS server 560 may resolve the DNS request on the basis of the mobile access information as provided by the boosting controller 460, e.g., on the basis of the IMEI of the UE 410. On the basis of the mobile access information, the CDN DNS server 560 can for example either return the network address of the edge server 470 or the network address of the cache server 480. Further, the CDN server 560 could return the network address of a cache server 480 which stores content which is adapted to a certain mobile access scenario, e.g., to a certain type of UE, and/or to a certain type of RAT. In some cases, the CDN DNS 560 server could also return the network address of the CP server 520.

In an alternative scenario, the boosting controller 460 could operate as a transparent DNS proxy and perform, on the basis of the mobile access information, redirection of DNS queries to an alternative DNS server, e.g., to a CDN DNS server acting as a replacement of the CDN DNS server 560. For this purpose, the boosting controller 460 could adapt a received DNS query by changing the destination IP address to the IP address of the alternative DNS server and by changing the source IP address to the IP address of the boosting controller 460. With respect to a DNS response from the alternative DNS server, the boosting controller 460 could perform a reverse adaptation, by changing the destination IP address to the IP address of the UE 410 and changing the source IP address to the IP address of the CDN DNS server 560. In this scenario, the boosting controller would perform the adaptation of the lookup procedure on the basis of the mobile access information by selecting between the CDN DNS 560 and the alternative DNS server. The CDN DNS 560 and the alternative DNS server could be statically configured.

Figure 5:
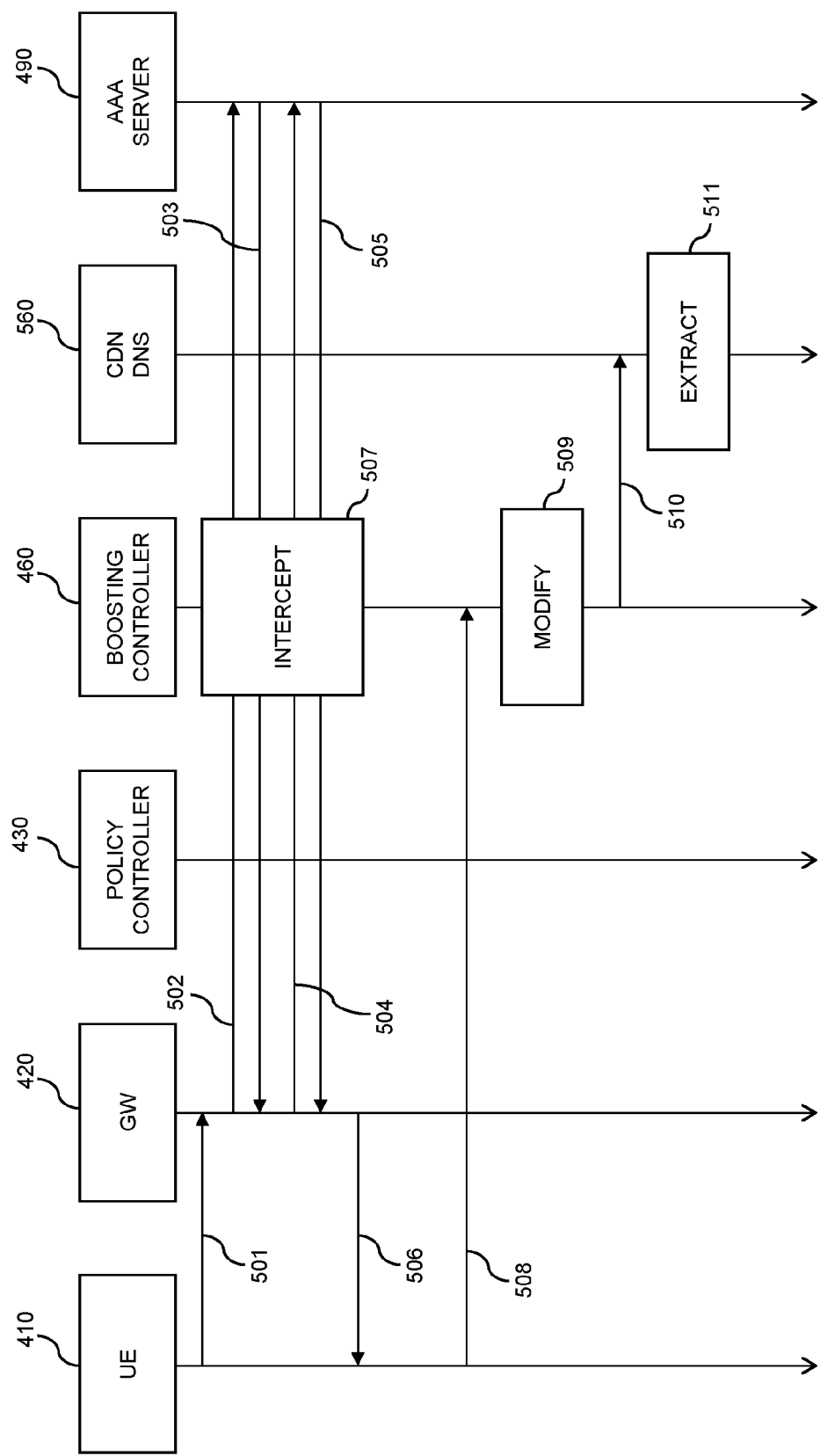
FIG. 5 shows a signaling diagram for illustrating a scenario of handling mobile access information according to an embodiment of the invention.

FIG. 5 further illustrates an exemplary scenario of handling the mobile access information in the content booster architecture of FIG. 4.

In the scenario of FIG. 5, the UE 410 initiates establishment of a session by sending a session establishment request message 501 to the GW 420. The GW 420 then performs authentication of the session with respect to an Authentication, Authorization and Accounting (AAA) server 490 of the mobile network. In the illustrated example, this is accomplished by the GW 420 sending an access request message 502 to the AAA server 490, the AAA server 490 returning an access accept message 503 to the GW 420, the GW 420 sending an accounting request message 504 to the AAA server 490, and the AAA server 490 returning an accounting accept message 505 to the GW 420. The authentication messages 502, 503, 504, 505 may be based on an authentication protocol as used in the mobile network, e.g., RADIUS or DIAMETER. The GW 420 informs the UE 410 that the session was authorized by sending a session establishment accept message 506 to the UE 410.

As illustrated by step 507, the boosting controller 460 intercepts at least one of the authentication messages 502, 503, 504, 505. In this way, the boosting controller 460 can obtain mobile access information of the session which is being established, e.g., IMEI of the UE 410, IMSI used by the UE 410, SGSN address used for the session, location of the UE 410, or the like.

For allowing the obtained mobile access information to be used for performing the above-described adaptation of the lookup procedure at the CDN DNS server 560, the boosting controller 460 provides at least a part of the obtained mobile access information to the CDN DNS server 560. In the scenario of FIG. 5, this is accomplished by inserting the mobile access information to be provided to the CDN DNS server 560 into a message of the DNS traffic DT to the CDN DNS server 560.

In particular, the UE 410 may issue a DNS query 508. The boosting controller 460 receives the DNS query 508 and, as illustrated by step 509, modifies it by inserting the mobile access information. The boosting controller 460 sends the modified DNS query 510 toward the CDN DNS server 560. Here, it is to be understood that this may actually be accomplished indirectly, i.e., via one or more further DNS servers, such as the local DNS server 425 of FIG. 4. Inserting the mobile access information into the DNS query 508 may for example be accomplished by adding an optional section to the DNS query 508 and inserting the mobile access information into this optional section, e.g., an optional resource record as defined in RFC2671.

The CDN DNS server 560 receives the modified DNS query 510 and, as indicated by step 511, extracts the mobile access information therefrom. This may for example involve identifying an optional section, e.g., an optional resource record as defined in RFC2671, in the modified DNS query 511 and extracting the mobile access information from this optional section.

The CDN DNS server 560 may then use the extracted mobile access information for processing the modified DNS query 511 or subsequent DNS queries from the UE 410.

It is to be understood that the procedures of FIG. 5 could also be applied for transmitting the mobile access information between other entities. For example, the mobile access information could also be obtained at the GW 420 and then inserted into a DNS query. Further, when routing the DNS traffic through the policy controller 430, the mobile access information could also be obtained at the policy controller 430 and then inserted into a DNS query. In the latter case, the policy controller 430 could for example implement functions of the local DNS server 425 or be co-located with the local DNS server 425. Furthermore, the mobile access information could be extracted at other nodes than the CDN DNS server 560, e.g., at a standalone lookup adaptation device.

Figure 6:
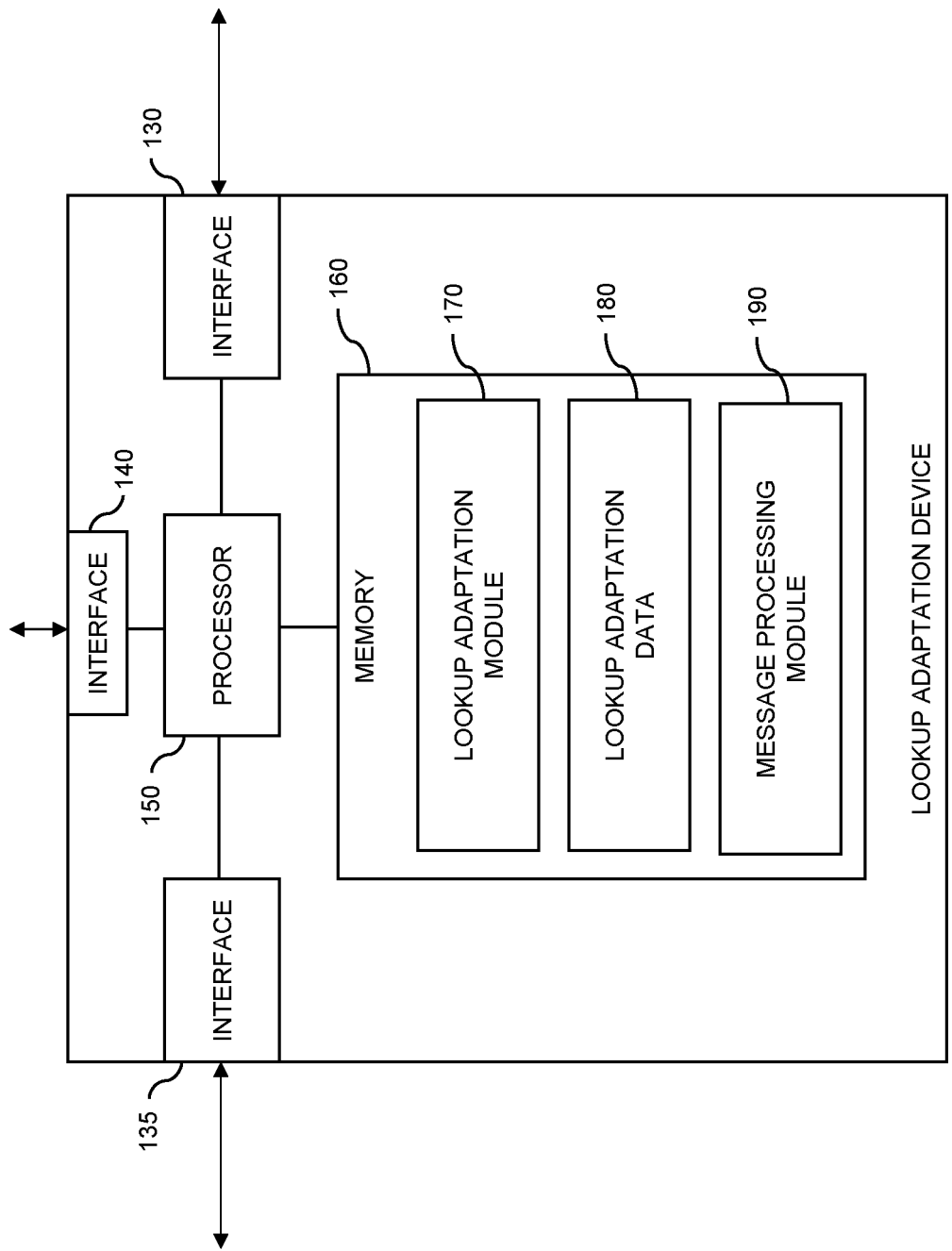
FIG. 6 schematically illustrates a network device according to an embodiment of the invention.

FIG. 6 further schematically illustrates an exemplary structure of a network device for implementing the lookup adaptation device 100. As mentioned above, the lookup adaptation device 100 may be implemented in various types of network devices, e.g., in an external DNS server, such as the CDN DNS server 560, or in a local DNS server, such as the DNS server 425. Further, the lookup adaptation device could also be implemented as a standalone device.

In the illustrated implementation, the lookup adaptation device 100 includes a first interface 130 configured to receive messages of a lookup procedure, e.g., DNS queries or responses to DNS queries. Further, the lookup adaptation device 100 also includes a second interface 135 configured to transmit messages of a lookup procedure, e.g., to send or forward DNS queries or to send responses to DNS queries.

Moreover, the lookup adaptation device 100 may also be provided with a control interface 140, which can be used to obtain lookup adaptation data and/or or other data from which the lookup adaptation data may be derived. In some embodiments, the control interface 140 may be used to obtain the mobile access information, e.g., from a node of the mobile network or from the boosting controller 460.

Further, the lookup adaptation device 100 includes a processor 150 coupled to the interfaces 130, 135, 140 and a memory 160 coupled to the processor 150. The memory 160 may include a read-only memory (ROM), e.g. a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the lookup adaptation device 100. More specifically, the memory 160 may include a lookup adaptation module 170 so as to implement the above-described mechanisms of adapting lookup procedures and lookup adaptation data 180 to be used in the process of adapting the lookup procedure. In addition, the memory 160 may include a message processing module 190 so as to implement the above-described extraction of the mobile access information from a received message of the lookup procedure.

It is to be understood that the structure as illustrated in FIG. 6 is merely schematic and that the lookup adaptation device 100 may actually include further components which, for the sake of clarity, have not been illustrated, e.g., further interfaces. Also, it is to be understood that the memory 160 may include further types of program code modules, which have not been illustrated. According to some embodiments, also a computer program product may be provided for implementing concepts according to embodiments of the invention, e.g., a computer-readable medium storing the program code and/or at least a part of the lookup adaptation data to be stored in the memory 160.

Figure 7:
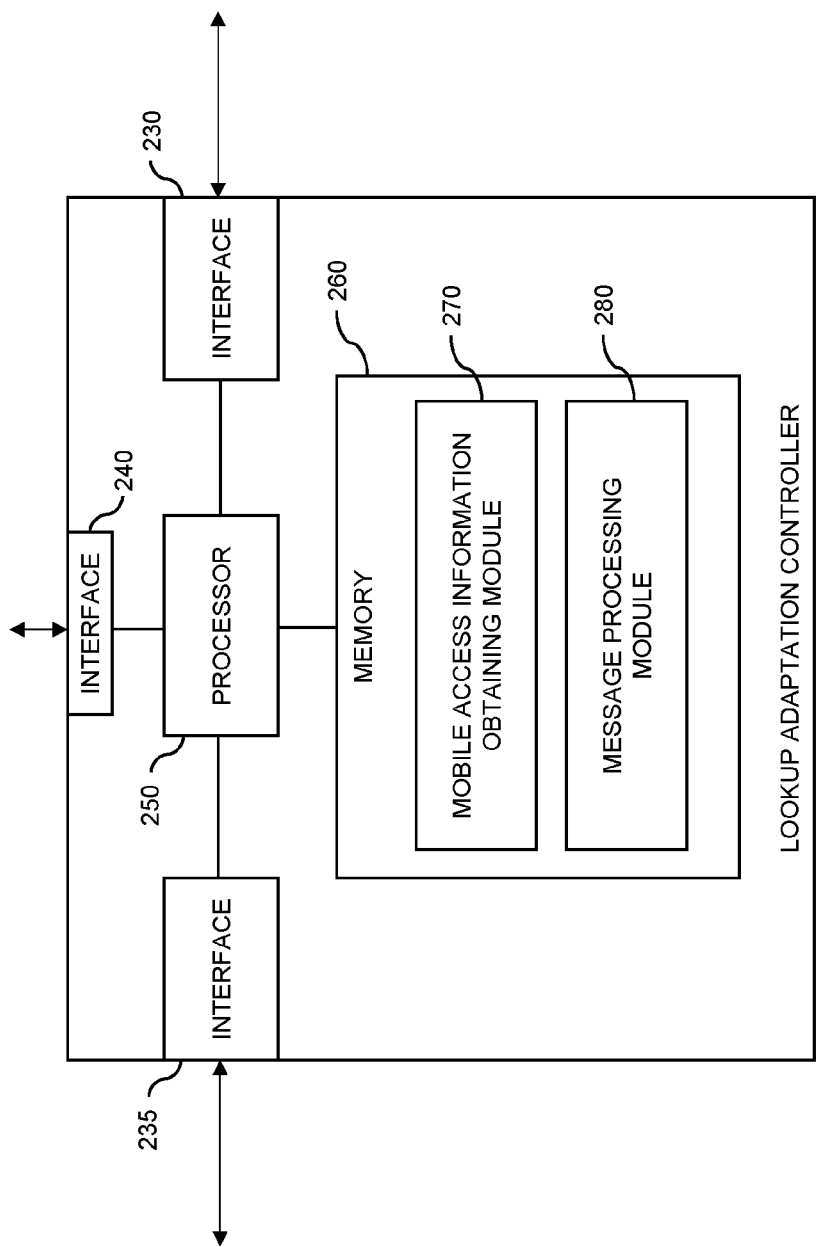
FIG. 7 schematically illustrates a further network device according to an embodiment of the invention.

FIG. 7 further schematically illustrates an exemplary structure of a network device for implementing the lookup adaptation controller 200. The lookup adaptation controller 200 may be implemented in various types of network devices, e.g., in a mobile network node such as the policy controller 30 or 430, or in the boosting controller 460. Further, the lookup adaptation controller 200 could also be implemented as a standalone device.

In the illustrated implementation, the lookup adaptation controller 200 includes a first interface 230 configured to receive messages of a lookup procedure, e.g., DNS queries or responses to DNS queries. Further, the lookup adaptation controller 200 also includes a second interface 235 configured to transmit messages of a lookup procedure, e.g., to send or forward DNS queries or to send responses to DNS queries. In some embodiments, the first and second interfaces 230, 235 could also be implemented in a single bidirectional interface.

Moreover, the lookup adaptation controller 200 may also be provided with a further interface 240, which can be used to obtain the mobile access data and/or or other data from which the mobile access data may be derived. In some embodiments, the further interface 240 may be an interface with respect to a node of the mobile network, e.g., for receiving authentication messages or copies thereof.

Further, the lookup adaptation controller 200 includes a processor 250 coupled to the interfaces 230, 235, 240 and a memory 260 coupled to the processor 250. The memory 260 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 260 includes suitably configured program code to be executed by the processor 250 so as to implement the above-described functionalities of the lookup adaptation controller 200. More specifically, the memory 260 may include a mobile access information obtaining module 270 so as to implement the above-described mechanisms of obtaining mobile access information, e.g., from one or more authentication messages. In addition, the memory 260 may include a message processing module 280 so as to implement the above-described insertion of the mobile access information into a message of the lookup procedure.

It is to be understood that the structure as illustrated in FIG. 7 is merely schematic and that the lookup adaptation controller 200 may actually include further components which, for the sake of clarity, have not been illustrated, e.g., further interfaces. Also, it is to be understood that the memory 260 may include further types of program code modules, which have not been illustrated, e.g., program code modules for implementing functionalities of the boosting controller 460. According to some embodiments, also a computer program product may be provided for implementing concepts according to embodiments of the invention, e.g., a computer-readable medium storing the program code and/or at least a part of the lookup adaptation data to be stored in the memory 260.

Figure 8:
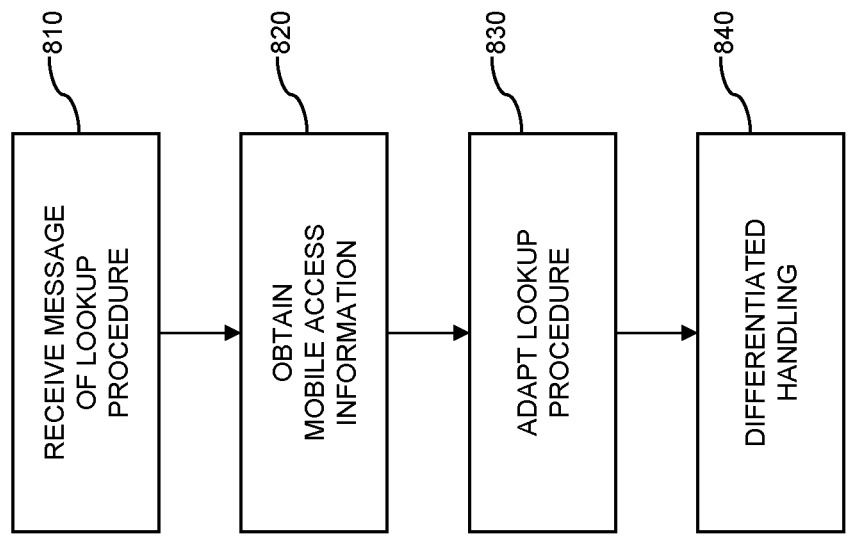
FIG. 8 shows a flowchart for illustrating a method according to an embodiment of the invention.

FIG. 8 shows a flowchart for schematically illustrating a method for enabling differentiated handling of data traffic between a UE, e.g., the UE 10 or 410, and a network resource, e.g., corresponding to the server 80 of FIGS. 2 and 3 or to the CP server 520 of FIG. 4. The method may be used to implement the above described concepts of mobile-access information based adaptation of the lookup procedure, e.g., in the mobile network environment of FIG. 1 or FIG. 4. Accordingly, the method may be performed by the lookup adaptation device 100, which in turn may be implemented by a DNS server, e.g., the CDN DNS server 560 or the local DNS server 425. In some embodiments, the lookup adaptation device 100 may also be implemented by a standalone device or by the boosting controller 460. In some embodiments, the method may also be implemented by a network system including the lookup adaptation device 100, a communication device, and optionally also the lookup adaptation controller 200. As explained above, the method based on the assumption that the data traffic is related to a network resource, e.g., provided an internet service or a content provider, and that the data traffic is preceded by a lookup procedure for obtaining a network address of the network resource.

At step 810, a message of the lookup procedure is received, e.g., using the interface 130 of the lookup adaptation device 100 as illustrated in FIG. 6. The message may be a DNS message, e.g., a DNS query or a response to a DNS query.

At step 820, mobile access information is obtained. In some scenarios, the mobile access information may be obtained by the lookup adaptation device itself, e.g., if the lookup adaptation device 100 is located within or associated with a node of the mobile network, such as the gateway 26 or 420 or the policy controller 30 or 430, or if the node performing the adaptation of the lookup procedure otherwise has access to certain information used in the mobile network, such as the boosting controller 460 of FIG. 4, which receives the copied authentication traffic CR. In other scenarios, the mobile access information may be received from another node, e.g., as explained in connection with FIG. 5. In particular, the mobile access information may be extracted from a message of the lookup procedure, e.g., from an optional section of a DNS message.

The mobile access information may include a mobile network subscriber identifier used by the UE for connecting to the mobile network, e.g., an IMSI or MSISDN, a hardware identifier of the UE, e.g., an IMEI, a RAT identifier indicating a RAT used by the UE for connecting to the mobile network, a mobile network gateway address of a gateway used by the UE for connecting to the mobile network, e.g., an SGSN address, and/or a location of the UE, e.g., in terms of a mobile network cell to which the UE is connected. The mobile access information may also include other information used in the mobile network for establishing or maintaining the connection to the UE. The mobile access information may for example originate from one or more authentication messages transmitted within the mobile network, such as the authentication messages 502, 503, 504, 505 of FIG. 5.

At step 830, the message is processed so as to adapt the lookup procedure. This is accomplished on the basis of the mobile access information. Depending on the mobile access information, the lookup procedure may return a network address of a replacement network resource. Examples of such replacement network resources are the replacement server 60 of FIGS. 2 and 3, which may be a cache server or tunnel edge server, the edge server 470 of FIG. 4, and the cache server 480 of FIG. 4. The replacement network resource is capable of handling the data traffic in place of the network resource. For this purpose, the replacement network resource may cache content provided by the network resource and/or operate as a proxy node with respect to the network resource. The adaptation of the lookup procedure may also be used to select, depending on the mobile access information, between different replacement network resources capable of handling the data traffic in place of the network resource by returning the corresponding network address. For example, there could be a selection between caches storing different versions of the same content, one version being adapted to a certain type of UE and the other version being adapted to another type of UE. The types of UE could be identified by an IMEI included in the mobile access information. If the adaptation of the lookup procedure is based on modifying or redirecting DNS messages, this may also be referred to as IMEI based DNS redirection.

At step 840, differentiated handling of the data packets is accomplished on the basis of the network address of the replacement network resource. For this purpose, the network address of the replacement network resource matches a packet filter for directing the data traffic to a bearer established between the UE and the mobile network, e.g., a bearer offering a desired QoS level. The packet filter may be installed in a communication device, e.g., in the UE or in a gateway of the mobile network, e.g., the gateway 26 or 420. By appropriate selection of the network address of the replacement network resource, e.g., from a range of private IP addresses, a simple structure of the packet filter can be achieved. For example, a total range from which the network address of the replacement network can be selected can be organized into subranges corresponding to different traffic classes. The subranges could then correspond to different subnets. With such an organization different scenarios of differentiated handling may be addressed. For example, in the case of different network resources for which the related data traffic is to be handled in the same way, the network addresses of the corresponding replacement network resources can be selected from the same subrange. On the other hand, in the case of different network resources for which the related data traffic is to be handled in different ways, the network addresses of the corresponding replacement network resources can be selected from different subranges.

Figure 9:
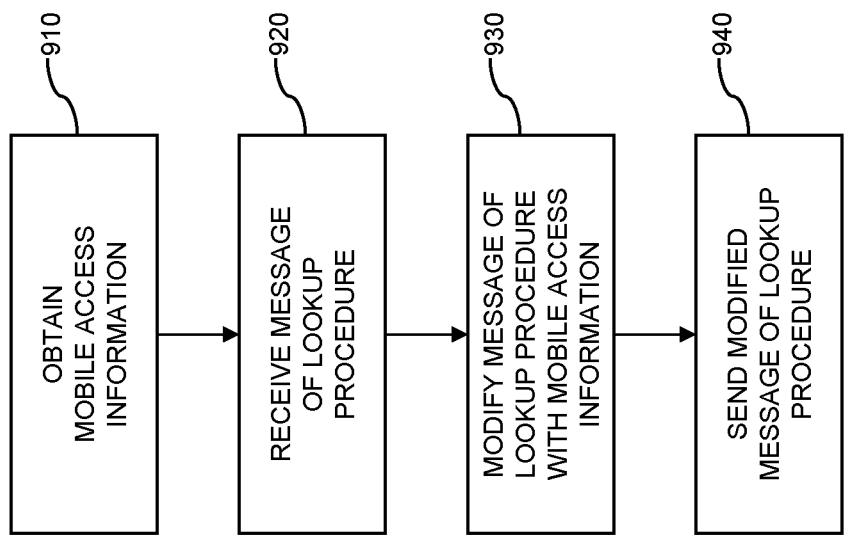
FIG. 9 shows a flowchart for illustrating a further method according to an embodiment of the invention.

FIG. 9 shows a flowchart for schematically illustrating a further method for enabling differentiated handling of data traffic between a UE, e.g., the UE 10 or 410, and a network resource, e.g., corresponding to the server 80 of FIGS. 2 and 3 or to the CP server 520 of FIG. 4. The method may be used to implement the above described concepts of mobile-access information based adaptation of the lookup procedure, e.g., in the mobile network environment of FIG. 1 or FIG. 4. The method may be used to provide the mobile access information to a node outside the mobile network so as to be used by this node when performing the mobile-access information based adaptation of the lookup procedure. The method may be performed by the lookup adaptation controller 200, which in turn may be implemented by a node within the mobile network, e.g., the policy controller 30 or 430 or the gateway 26 or 420. In some embodiments, the lookup adaptation controller 200 may also be implemented by the boosting controller 460. As explained above, the method based on the assumption that the data traffic is related to a network resource, e.g., provided an internet service or a content provider, and that the data traffic is preceded by a lookup procedure for obtaining a network address of the network resource.

At step 910, mobile access information is obtained. For this purpose, the lookup adaptation controller 200 may have access to certain information used in the mobile network, such as the boosting controller 460 of FIG. 4, which receives the copied authentication traffic CR.

The mobile access information may include a mobile network subscriber identifier used by the UE for connecting to the mobile network, e.g., an IMSI or MSISDN, a hardware identifier of the UE, e.g., an IMEI, a RAT identifier indicating a RAT used by the UE for connecting to the mobile network, a mobile network gateway address of a gateway used by the UE for connecting to the mobile network, e.g., an SGSN address, and/or a location of the UE, e.g., in terms of a mobile network cell to which the UE is connected. The mobile access information may also include other information used in the mobile network for establishing or maintaining the connection to the UE. The mobile access information may for example be obtained by receiving an authentication message for authenticating the UE in the mobile network, such as the authentication messages 502, 503, 504, 505 of FIG. 5, and by obtaining the mobile access information from the received authentication message.

At step 920, a message of the lookup procedure is received, e.g., a DNS query such as the DNS query 508 of FIG. 5. At step 930, the received message of the lookup procedure is modified by inserting the obtained mobile access information. This may for example be accomplished by adding an optional section, which includes the mobile access information, to the message, e.g., as explained for step 509 of FIG. 5.

At step 940, the modified message of the lookup procedure is sent toward the node performing the adaptation of the lookup procedure. This may be accomplished directly or indirectly, e.g., via an intermediate DNS server.

The methods of FIGS. 8 and 9 may be combined with each other, e.g., in a system including a first network device implementing functionalities of the lookup adaptation controller and a second network device implementing functionalities of the lookup adaptation device. In particular, the method of FIG. 9 may be used to provide the mobile access information to be used in the method of FIG. 8.

As can be seen, by using the above described concepts, differentiated handling of data traffic related to one or more specific network resources can be implemented in a very efficient manner. In particular, the adaptation of the lookup procedure can be performed to take into account specific aspects relating to the connection between the UE and the mobile network, e.g., type of UE, identity of the mobile network subscriber, or the like, in order to achieve a smart decision in which way the lookup procedure should be adapted.

It is to be understood that the examples and embodiments as explained above are merely illustrative and susceptible to various modifications. For example, the concepts could be used in other types of mobile network. Also, the actual location of performing the adaptation of the lookup procedure and/or obtaining the mobile access information could be modified. Further, the mobile access information could be obtained from a plurality of different sources. Further, it is to be understood that the above concepts may be implemented by using correspondingly designed software in existing network devices, or by using dedicated network device hardware.

The invention claimed is:

1. A method, in a lookup adaptation device, for enabling differentiated handling of mobile network data traffic between a user equipment and a network resource, said data traffic being preceded by a lookup procedure for obtaining a network address of the network resource, the method comprising:
  obtaining mobile access information used in a mobile network for establishing, controlling, or maintaining a connection of the user equipment to the mobile network, or for a combination of said establishing, controlling, and maintaining; and
  on the basis of the mobile access information, processing a message of the lookup procedure for adapting the lookup procedure to return a network address of a replacement network resource capable of handling the data traffic by operating as a proxy node for the network resource;
  wherein the network address of the replacement network resource matches a packet filter for directing the data traffic to a bearer established between the user equipment and the mobile network.

2. The method of claim 1, wherein said obtaining is performed by extracting the mobile access information from a message of the lookup procedure.

3. The method of claim 1, wherein the mobile access information is obtained from an authentication message for authenticating the user equipment in the mobile network.

4. The method of claim 1, wherein the mobile access information comprises at least one element of a group comprising:
  a mobile network subscriber identifier used by the user equipment for connecting to the mobile network,
  a hardware identifier of the user equipment,
  a radio access technology identifier indicating a radio access technology used by the user equipment for connecting to the mobile network,
  a mobile network gateway address of a gateway used by the user equipment for connecting to the mobile network, and
  a location of the user equipment.

5. The method of claim 1, wherein said processing of the message comprises:
  receiving a query for a network address of the network resource; and
  responding to the query with the network address of the replacement network resource.

6. The method of claim 1, wherein said processing of the message comprises:
  receiving a response to a query for a network address of the network resource; and
  modifying the response by replacing the network address of the network resource with the network address of the replacement network resource.

7. The method of claim 1, wherein said processing of the message comprises redirecting a query for a network address of the network resource.

8. The method of claim 1, wherein the replacement network resource comprises a cache server or a tunnel edge server.

9. A network device for enabling differentiated handling of mobile network data traffic between a user equipment and a network resource, the network device comprising:
  an interface for receiving a message of a lookup procedure for obtaining a network address of a network resource, and
  a processor configured to:
    obtain mobile access information used in a mobile network for establishing, controlling, or maintaining a connection of the user equipment to the mobile network, or for a combination of said establishing, controlling, and maintaining; and on the basis of the mobile access information, process a received message of the lookup procedure for adapting the lookup procedure to return a network address of a replacement network resource capable of handling the data traffic by operating as a proxy node for the network resource;

wherein the network address of the replacement network resource matches a packet filter for directing the data traffic to a bearer.

10. A network system for enabling differentiated handling of mobile network data traffic between a user equipment and a network resource, said data traffic being preceded by a lookup procedure for obtaining a network address of the network resource, the network system comprising:

at least one communication device comprising a packet filter for directing the data traffic to a bearer; and a network device configured to:

obtain mobile access information used in a mobile network for establishing, controlling, or maintaining a connection of the user equipment to the mobile network, or for a combination of said establishing, controlling, and maintaining; and on the basis of the mobile access information, process a received message of the lookup procedure for adapting the lookup procedure to return a network address of a replacement network resource capable of handling the data traffic by operating as a proxy node for the network resource;

wherein the network address of the replacement network resource matches the packet filter for directing the data traffic to a bearer.

11. The network system of claim 10, comprising:

a further network device;

wherein the further network device is configured to:
receive a message of the lookup procedure;
modify the message of the lookup procedure by inserting the mobile access information; and
forward the modified message of the lookup procedure to the network device, and wherein the network device is configured to extract the mobile access information from the modified message of the lookup procedure.

12. A non-transitory computer-readable medium comprising program code stored thereupon for execution by a processor of a network device for enabling differentiated handling of mobile network data traffic between a user equipment and a network resource, said data traffic being preceded by a lookup procedure for obtaining a network address of the network resource, wherein the program code is configured to cause the network device to:

obtain mobile access information used in a mobile network for establishing, controlling, or maintaining a connection of the user equipment to the mobile network, or for a combination of said establishing, controlling, and maintaining; and on the basis of the mobile access information, process a message of the lookup procedure for adapting the lookup procedure to return a network address of a replacement network resource capable of handling the data traffic by operating as a proxy node for the network resource;

wherein the network address of the replacement network resource matches a packet filter for directing the data traffic to a bearer established between the user equipment and the mobile network.

* * * * *